United States Patent [19]

Takamatsu et al.

[11] 4,077,266
[45] Mar. 7, 1978

[54] DEVICE FOR DETECTING ANGULAR ACCELERATIONS AND DECELERATIONS OF A VEHICLE ROAD WHEEL

[75] Inventors: Hiroshi Takamatsu, Ooi; Makoto Sato, Kamifukuoka; Yoshitaka Miyagawa, Kawagoe; Yutaka Arai, Shiki; Etsuo Fujii, Wako, all of Japan

[73] Assignee: Honda Giken Kogyo Kabushiki Kaisha, Tokyo, Japan

[21] Appl. No.: 787,266

[22] Filed: Apr. 13, 1977

[30] Foreign Application Priority Data

Apr. 15, 1976 Japan .................................. 51-41841

[51] Int. Cl.² ............................................. G01P 15/08
[52] U.S. Cl. ..................................................... 73/517 A
[58] Field of Search ............... 73/514, 515, 516 R, 73/517 A; 303/24 R, 24 A; 188/181 A

[56] References Cited

U.S. PATENT DOCUMENTS 2,257,315  9/1941  Sorensen ........................... 73/517 A

FOREIGN PATENT DOCUMENTS 1,438,335  4/1966  France ............................. 73/517 A
47-9633    6/1972  Japan .................................. 73/515

Primary Examiner—James J. Gill
Attorney, Agent, or Firm—Haseltine, Lake & Waters

[57] ABSTRACT

A device for detecting angular accelerations and decelerations of a vehicle wheel. The device comprises a first shutter member of cylindrical shape secured to a rotating member of a vehicle, which rotates with a vehicle road wheel, and having a cylindrical side wall formed therethrough with a multitude of circumferentially equispaced holes, a sensor weight mounted on said rotating member through damping means for limited angular movement relative thereto, a second shutter member of cylindrical shape secured to said weight and arranged in radially spaced coaxial relation with said first shutter member, said second shutter member having a cylindrical side wall formed therethrough with a multitude of circumferentially equispaced holes. Said last-mentioned holes being arranged so as to be registrable with said first-mentioned holes but normally placed out of registry therewith, a pair of light-beam emitting and receiving means fixedly mounted on a nonrotating member of the vehicle in radially aligned, spaced and opposite relation to each other with said first and second shutter members disposed therebetween, wherein when said sensor weight is caused, due to an angular acceleration or deceleration of said wheel exceeding a prescribed value, to rotate relative to said rotating member, said holes in said first and second shutter members are placed into registry with each other so that said light-beam receiving means receives light beam emitted from said light-beam emitting means.

6 Claims, 6 Drawing Figures

DEVICE FOR DETECTING ANGULAR ACCELERATIONS AND DECELERATIONS OF A VEHICLE ROAD WHEEL

BACKGROUND AND SUMMARY OF THE INVENTION

This invention relates to a device for detecting angular accelerations and decelerations of a vehicle road wheel and, more specifically, to such a device particularly suitable for use with vehicle anti-skid brake control apparatus.

The primary object of the present invention is to provide a novel device of the kind as described above which is capable of the most accurate detection of an angular wheel acceleration and deceleration exceeding a prescribed level during a substantially extended service life without employing any mutually contacting elements.

According to the present invention, there is provided a device for detecting angular accelerations and decelerations of a vehicle road wheel comprising a first shutter member of cylindrical shape secured coaxially to a rotating member of a vehicle, which rotates with said vehicle road wheel, and having a cylindrical side wall formed therethrough with a plurality of circumferentially equispaced light-beam passage holes, a sensor weight mounted on said rotating member through a damping means for limited angular displacement relative thereto, a second shutter member of cylindrical shape secured to said weight in coaxial relation with said first shutter member, said second shutter member having a cylindrical side wall formed therethrough with a plurality of light-beam passage holes corresponding to said first-mentioned holes in said first shutter member, said last-mentioned holes being circumferentially equispaced at the same interval as that of said first-mentioned holes and arranged normally out of registry therewith, a pair of light-beam emitting and receiving means fixedly mounted on a non-rotating member of the vehicle in radially aligned, spaced and opposite relation to each other with said first and second shutter members interposed therebetween, wherein when said sensor weight is caused, due to an angular acceleration or deceleration of said wheel exceeding a prescribed value, to rotate relative to said rotating member at a predetermined certain angle of rotation, said light-beam passage holes in said first and second shutter members are placed into registry with each other so that said light-beam receiving means receives light beams emitted from said light-beam emitting means to produce a desired output signal.

The above and other objects, features and advantages of the present invention will be more fully understood from the following detailed description of the invention, when read in conjunction with the accompanying drawings, which illustrate one exemplary, presently preferred embodiment of the invention.

BRIEF DESCRIPTION OF THE ACCOMPANYING DRAWINGS

DESCRIPTION OF THE PREFERRED EMBODIMENT

Figure 1:
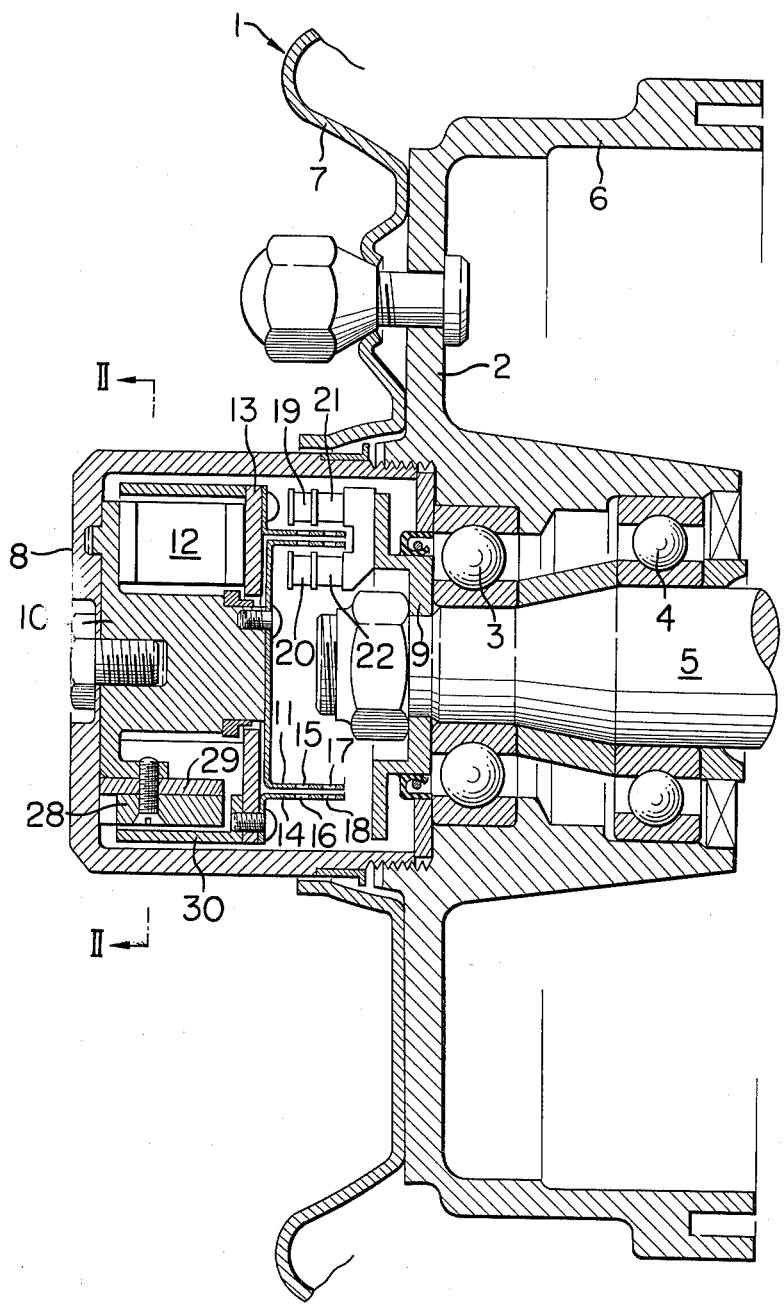
FIG. 1 is a cross-sectional side view of a preferred form of the device constructed according to the present invention.

Referring to the drawings, reference numeral 1 generally indicates a driven wheel of an automotive vehicle, of which wheel hub 2 is rotatably supported on a fixed axle 5 by means of bearings 3, 4. Reference numerals 6 and 7 indicate a brake drum and a wheel disc, respectively.

Fixedly mounted on the wheel hub 2 for rotation with the wheel 1 is a cylindrical-shaped casing 8, to the interior surface of which at the closed end thereof is fixedly secured by means of a setscrew a rotary support 10 having a first cylindrical shutter member 11 rigidly attached thereto. A sensor weight 13 is mounted on the rotary support 10 through the medium of a leaf spring 12 for rotation relative to the casing 8 in the forward and reverse rotating directions within a predetermined certain range of angular displacement and a second cylindrical shutter member 14 is rigidly attached to the weight 13 in coaxial and encircling relation with the first shutter member 11. The first shutter member 11 is formed through its peripheral wall with a multitude of first and second light-beam passage windows or holes 15, 17 which are arranged in two rows and circumferentially equispaced from each other in the respective rows and the second shutter member 14 is similarly formed through its peripheral wall with two rows of third and fourth light-beam passage holes 16, 18 which in the respective rows are circumferentially equispaced from each other in such a manner as to correspond to the first and second windows or holes 15, 17, respectively. These first and second shutter members 11, 14 are arranged such that the first and third rows of light-beam passage holes 15, 16 are normally displaced circumferentially relative to each other in the free unloaded condition of the leaf spring 12 and placed into registry with each other only when the second shutter member 14 along with the sensor weight 13 is caused to rotate to a predetermined certain angle of rotation relative to the first shutter member 11 in the same rotating direction as that of the vehicle wheel 1, whereas the second and fourth rows of light-beam passage holes 17, 18 are normally displaced circumferentially relative to each other in the free unloaded condition of the leaf spring 12 and placed into registry with each other only when the second shutter member 14 along with the sensor weight 13 is caused to rotate to a predetermined certain angle of rotation relative to the first shutter member 11 in the rotating direction opposite to that of the vehicle wheel 1.

Fixedly mounted on the fixed axle 5 at the open end of the casing 8 is a bracket plate 9 carrying a pair of first light-beam emitter and receiver 19, 20, which are arranged in radially aligned, spaced opposite relation to each other with the rotation paths of the first and third light-beam passage holes 15, 16 interposed therebetween, and a pair of second light-beam emitter and receiver 21, 22, which are arranged in radially aligned, spaced opposite relation to each other with the rotation paths of the second and fourth light-beam passage holes 17, 18 interposed therebetween. The light-beam receivers 20, 22 are each actuated by light beams projected from the associated emitters 19, 21 to produce an output signal for operation of an appropriate operational equipment, not shown.

Figure 2:
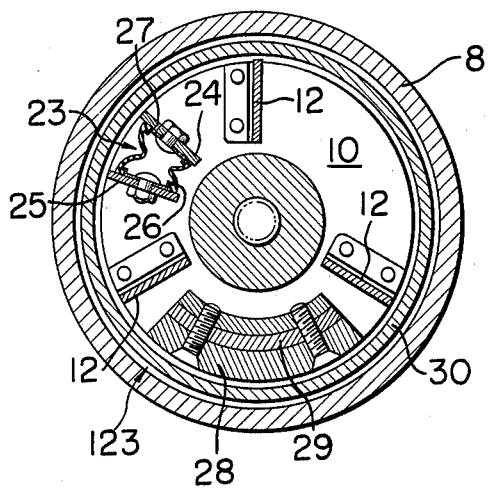
FIG. 2 is a cross-sectional view taken along the line II—II in FIG. 1.
Figure 3:
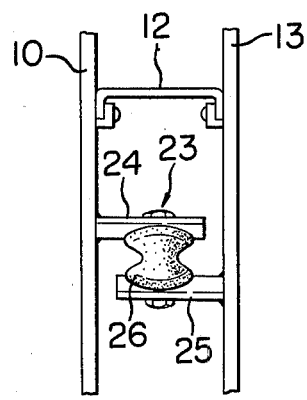
FIG. 3 is a plan view showing the connection between the sensor weight and the rotary support.
Figure 4:
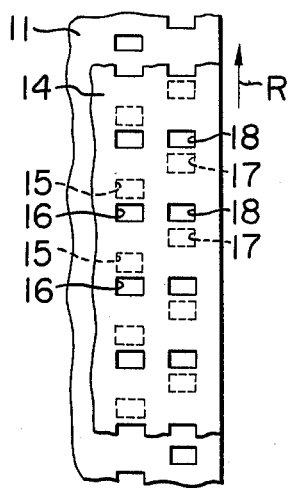
FIG. 4 is a development view showing the relative arrangement between first and second shutter members.

Disposed between the rotary support 10 and the sensor weight 13 is a damping means for damping rotational oscillations of the sensor weight 13, for which, for the sake of convenience in explanation, there are illustrated in FIGS. 2 and 3 two kinds of damping elements 23, 123 but practically either one of these will suffice. One of the damping elements, 23, is of pneumatic type and comprises a pair of brackets 24, 25 fixed to both the rotary support 10 and the sensor weight 13, and an expansible and collapsible air bag 26 connected between the brackets 24, 25 and communicating interiorly with the atmosphere through an orifice 27. Due to this damping element 23, rotational oscillations of the sensor weight 13 are materially damped by the throttling resistance of the orifice 27 against air passing therethrough in accordance with the expansion and compression of the air bag 26. The other damping element 123 is of electromagnetic type and comprises a magnet 28 secured through a magnetic substance 29 to the rotary support 10 in spaced opposite relation with the interior surface of the cylindrical wall of the casing 8, and a brake ring 30 of a non-magnetic, electroconductive material secured to the sensor weight 13 for free circumferential movement within the annular clearance formed between the magnet 28 and the casing 8 which, in this case, formed of a magnetic material. With this damping element 123, rotational oscillations of the sensor weight 13 are damped by the action of eddy electric current generated each time the brake wheel 30 is caused to rotate relative to the magnet 28 so as to cut across the magnetic flux running from the magnet 28 into the casing 8.

Now, reference is had to the operation of the present inventive device. Assuming that the wheel 1 and hence the casing 8 integral therewith are rotating at a constant speed, the rotary support 10 and the sensor weight 13 are both rotating at the same speed without causing any deformation of the leaf spring 12 and at the same time, the first and second shutter members 11, 14 carried by them are rotating with their light-beam passage holes 15, 16, 17, 18 held in the closed state so that light beams issuing from the first and second emitter 19, 21 are interrupted by means of the respective shutter members 11, 14, thereby holding the light-beam receivers 20, 22 in their inoperative condition.

Figure 5:
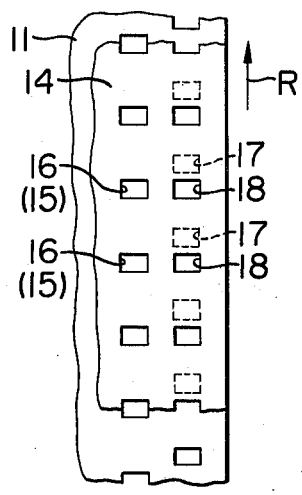
FIGS. 5 and 6 are development views respectively showing the different operational relationships between the two shutter elements.
Figure 6:
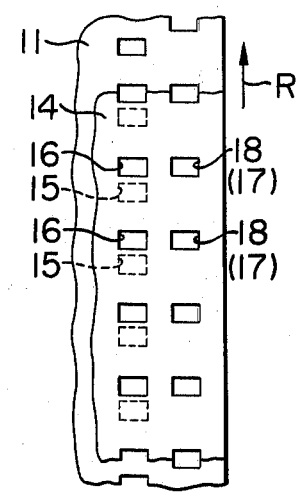

On the other hand, the wheel 1 is subjected to an angular deceleration exceeding a predetermined certain level, the sensor weight 13 is caused under inertial effect to rotate to a prescribed angle of rotation relative to the rotary support 10 in the rotating direction R of the wheel, while twisting the leaf spring 12 so that there similarly takes place a relative displacement between the shutter members 11, 14, placing the first and third light-beam passage holes 15, 16 into registry with each other, as shown in FIG. 5, to permit light beams from the first light-beam emitter 19 to pass through the holes 15, 16 each time the holes 15, 16 pass through the space between the first light-beam emitter and receiver 19, 20. As a result, the first light-beam receiver 20 receives the light beams passing through the holes 15, 16 every passage of the holes 15, 16 through the space between the first light-beam emitter and receiver 19, 20 to produce an output signal for transmission of the angular deceleration as sensed to a desired exterior equipment. If, however, the wheel 1 is accelerated to give an angular acceleration in excess of a prescribed value, there will take place a relative displacement between the shutter elements 11, 14, as shown in FIG. 6, placing the second and fourth light-beam passage holes 17, 18 into registry with each other so that the second light-beam receiver 22 receives the light beams emitted from the second light emitter 21 to produce an output signal for transmission of the sensed angular acceleration to the exterior.

To summarize, according to the present invention, a pair of first and second shutter members of cylindrical shape having a plurality of light-beam passage holes formed through their peripheral walls are secured one to the vehicle road wheel or to a rotating member, associated with the wheel for integral rotation, and the other to the sensor weight, which is movable in response to an angular acceleration or deceleration of the wheel, so that the light-beam passage holes in the first and second shutter members come into registry with each other only when the sensor weight is moved in response to an angular acceleration or deceleration of the associated road wheel exceeding a prescribed certain value, and two pair of first and second light-beam emitters and receivers are provided on a non-rotating member of the vehicle in radially aligned, spaced opposite relation to each other with the first and second shutter members interposed therebetween for sensing the angular acceleration and deceleration of the vehicle wheel to produce an appropriate output signal. With such construction and arrangement, there are formed no sliding contact portions in the component parts and consequently the sensor weight, being free from any frictional resistance, is highly sensitive to an angular acceleration or deceleration of the vehicle wheel in excess of a predetermined certain value so that an output signal representative of the detected angular wheel acceleration or deceleration can be produced with a maximum of accuracy.

Though one preferred embodiment of the invention has been shown and described, it will be readily understood that many changes and modifications may be made therein without departing from the spirit of the invention or the scope of the appended claims.

What is claimed is:

1. A device for detecting angular accelerations and decelerations of a vehicle road wheel comprising a first shutter member of cylindrical shape secured coaxially to a rotating member of a vehicle, which rotates with said vehicle road wheel, and having a cylindrical side wall formed therethrough with a plurality of circumferentially equispaced light-beam passage holes, a sensor weight mounted on said rotating member through damping means for limited angular displacement relative thereto, a second shutter member of cylindrical shape secured to said weight in coaxial relation with said first shutter member, said second shutter member having a cylindrical side wall formed therethrough with a plurality of light-beam passage holes corresponding to said first-mentioned holes in said first shutter member, said last-mentioned holes being circumferentially equispaced at the same interval as that of said first-mentioned holes and arranged normally out of registry therewith, a pair of light-beam emitting and receiving means fixedly mounted on a non-rotating member of the vehicle in radially aligned, spaced and opposite relation to each other with said first and second shutter members interposed therebetween, wherein when said sensor weight is caused, due to an angular acceleration or deceleration of said wheel exceeding a prescribed value, to rotate relative to said rotating member at a predetermined certain angle of rotation, said light-beam passage holes in said first and second shutter members are placed into registry with each other so that said light-beam receiving means receives light beam emitted from said light-beam emitting means to produce a desired output signal.

2. A device as claimed in claim 1, wherein said damping means is of pneumatic type.

3. A device as claimed in claim 2, wherein said pneumatic type of damping means comprises a pair of brackets secured to said rotating member and said sensor weight, respectively, and an air bag connected between said brackets for damping rotational oscillations of said weight relative to said rotating member, the interior of said bag being in communication with the atmosphere through a restricted orifice.

4. A device as claimed in claim 1, wherein said damping means is of electromagnetic type.

5. A device as claimed in claim 4, wherein said electromagnetic type of damping means comprises a magnet and a brake ring of a non-magnetic electro-conductive material one secured to said weight and the other to said rotating member so as to face with each other for damping under electro-magnetic force rotational oscillations of said weight relative to said rotating member.

6. A device as claimed in claim 1, wherein said first-mentioned holes in said first shutter member are arranged in two first and second rows, and said last-mentioned holes in said second shutter member are similarly arranged in two third and fourth rows, said first and third rows of holes adapted to be registrable with each other when said second shutter member is rotated, upon acceleration of said wheel in excess of said prescribed value, relative to said first shutter member in one rotating direction at said predetermined angle of rotation, whereas said second and fourth rows of holes adapted to be registrable with each other when said second shutter member is rotated, upon deceleration of said wheel in excess of said prescribed value, relative to said first shutter member in the other rotating direction at said predetermined angle of rotation, and wherein said light-beam emitting and receiving means comprise a pair of first light-beam emitter and receiver which are arranged in radial alignment so as to be registrable with said first and third rows of holes for producing an output signal when said wheel is subjected to an angular acceleration exceeding said prescribed value, and a pair of second light-beam emitter and receiver which are arranged in radial alignment so as to be registrable with said second and fourth rows of holes for producing an output signal when said wheel is subjected to an angular deceleration exceeding said prescribed value.

* * * * *